US012192730B2

(12) United States Patent
Tang et al.

(10) Patent No.: US 12,192,730 B2
(45) Date of Patent: Jan. 7, 2025

(54) MULTIFUNCTIONAL SOUND DEVICE

(71) Applicant: AAC Technologies (Nanjing) Co., Ltd., Nanjing (CN)

(72) Inventors: Yun Tang, Shenzhen (CN); Lubin Mao, Shenzhen (CN); Jie Ma, Shenzhen (CN); Ziang Li, Shenzhen (CN); Xingzhi Huang, Shenzhen (CN); Wei Song, Shenzhen (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 240 days.

(21) Appl. No.: 18/092,933

(22) Filed: Jan. 4, 2023

(65) Prior Publication Data

US 2024/0089663 A1 Mar. 14, 2024

Related U.S. Application Data

(63) Continuation of application No. PCT/CN2022/121380, filed on Sep. 26, 2022.

(30) Foreign Application Priority Data

Sep. 8, 2022 (CN) ......................... 202211096723.7

(51) Int. Cl.
*H04R 9/02* (2006.01)
*H04R 1/02* (2006.01)

(52) U.S. Cl.
CPC ............... *H04R 9/025* (2013.01); *H04R 1/02* (2013.01)

(58) Field of Classification Search
CPC ...... H04R 9/025; H04R 1/02; H04R 2400/03; H04R 1/021; H04R 7/04; H04R 2400/11; H04R 2499/11; H04R 9/06; H04R 9/063; H05K 1/189; H02K 33/16; H02K 35/02; H02K 1/34
See application file for complete search history.

(56) References Cited

U.S. PATENT DOCUMENTS

| | | | | |
|---|---|---|---|---|
| 11,950,046 B2 * | 4/2024 | Xiao | ...................... | H05K 1/189 |
| 11,968,515 B2 * | 4/2024 | Xiao | ...................... | H04R 9/063 |
| 12,041,435 B2 * | 7/2024 | Xiao | ...................... | H04R 9/025 |
| 2017/0033673 A1 * | 2/2017 | Wang | ...................... | H02K 33/16 |
| 2017/0117791 A1 * | 4/2017 | Mao | ...................... | H02K 1/34 |
| 2019/0207498 A1 * | 7/2019 | Mao | ...................... | H02K 35/02 |
| 2020/0044535 A1 * | 2/2020 | Tang | ...................... | H02K 33/16 |

* cited by examiner

*Primary Examiner* — Angelica M McKinney
(74) *Attorney, Agent, or Firm* — W&G Law Group

(57) ABSTRACT

A multifunctional sound device includes a housing, a sound unit, a vibrator, and a coil. The housing includes an accommodating cavity, and the sound unit is suspended in the accommodating cavity. The sound unit includes a frame, a vibration system, and a magnetic circuit system. The vibration system is fixed in the frame, and the magnetic circuit system drives the vibration system to vibrate and generate sound along a first direction, where the magnetic circuit system includes a magnetic gap. Since the speaker and the motor share one magnetic system, the sound unit and the vibrator are assembled in the housing, which greatly reduces occupied space. The sound unit and the vibrator form a dual-vibration system, and the sound unit cooperatively vibrates with the vibrator in addition to generating sound, which improves vibration effects and further avoids adding other components, thereby saving space.

10 Claims, 6 Drawing Sheets

A-A

MULTIFUNCTIONAL SOUND DEVICE

TECHNICAL FIELD

The present disclosure relates to a technical field of electroacoustic conversion, and in particular to a multifunctional sound device.

BACKGROUND

With the rapid development of consumer electronics industry, in particular to smart phones, end consumers have higher demands for device experience. Excepting vision, demands for hearing experience and touching experience further become higher and higher.

In the related art, performance improvement of a speaker module and a motor is generally achieved through increasing a size of a product. However, internal space of current electronic devices is becoming more compact, and batteries, main boards, and cameras in which occupy larger and larger space, therefore sizes of the speaker module and the motor cannot be increased and even need to be decreased, which is further conflict with the performance improvement. Therefore, mobile phone manufacturers ask for more requirements of smaller occupied space of the speaker module and the motor and further put forward higher requirements for vibration function of the motor.

Therefore, it is necessary to provide a speaker and a motor occupying a smaller space and having a stronger vibration function.

SUMMARY

The present disclosure aims to provide a multifunctional sound device to solve the technical problem that a speaker and a motor occupying a smaller space and having a stronger vibration function are provided.

In order to achieve above aims, the present disclosure provides the multifunctional sound device, including a housing, a sound unit, a vibrator, and a coil. The housing includes an accommodating cavity, and the sound unit is suspended in the accommodating cavity. The sound unit includes a frame, a vibration system, and a magnetic circuit system. The vibration system is fixed in the frame, and the magnetic circuit system drives the vibration system to vibrate and generate sound along a first direction, where the magnetic circuit system includes a magnetic gap. The vibrator is suspended in the accommodating cavity and disposed on one side, distal from the vibration system, of the magnetic circuit system, and the coil is assembled to the vibrator. The magnetic circuit system interacts with the coil to drive the vibrator to reciprocally vibrate in a second direction, and meanwhile, the magnetic circuit system drives the sound unit to reciprocally vibrate in the second direction. The second direction is perpendicular to the first direction.

Furthermore, the multifunctional sound device further includes first elastic components and second elastic components. The first elastic components are respectively connected to the housing and the sound unit, and the second elastic components are respectively connected to the housing and the vibrator.

Furthermore, the first elastic components are disposed on two opposite sides of the sound unit along the second direction, and the first elastic components are spaced apart from the second elastic components along the first direction.

Furthermore, the sound unit further includes an upper cover, and the upper cover is disposed on one side, distal from the magnetic circuit system, of the frame. The first elastic components are respectively connected to the housing and the upper cover.

Furthermore, the vibrator includes a main body portion, two side wall portions, and two mass blocks. The main body portion is suspended in the housing, the two side wall portions are formed by bending and extending from two opposite ends of the main body portion toward a direction of the sound unit, and the two mass blocks are respectively and fixedly connected to the main body portion; the two mass blocks are disposed at intervals between the two side wall portions.

Furthermore, each of the second elastic components includes a bearing portion and two elastic structures, the bearing portion is assembled to the main body portion, two ends of each of the two elastic structures are respectively and fixedly connected to the bearing portion and the housing, and the two elastic structures are disposed on two opposite sides of the bearing portion at intervals along the second direction; and the two elastic structures are at least partially fixed to the two side wall portions.

Furthermore, each of the two elastic structures includes a first connecting portion, an elastic portion, and a second connecting portion. The first connecting portion is fixedly connected to one end of the bearing portion and is disposed between the two side wall portions and the housing, the elastic portion is formed by bending from one end of the first connecting portion toward the vibrator, and the second connecting portion is formed by bending from one end, distal from the first connecting portion, of the elastic portion and is fixedly connected to the housing. The first connecting portion and the second connecting portion are oppositely disposed, and the first connecting portion is partially attached to a respective one of the two side wall portions.

Furthermore, a mounting through groove is defined on the main body portion, where the mounting through groove is matched with the coil. The coil is assembled in the mounting through groove, and the coil is disposed opposite to the magnetic gap along the first direction.

Furthermore, the magnetic circuit system includes a primary magnet and a secondary magnet, the secondary magnet is disposed around the primary magnet to form the magnetic gap. The vibration system includes a vibrating diaphragm, a dome frame, and a voice coil, the vibrating diaphragm is connected to the frame, the dome frame is connected to the vibrating diaphragm, and the voice coil is inserted into the magnetic gap and is connected to the dome frame.

Furthermore, the primary magnet includes an upper magnet and a lower magnet opposite to the upper magnet, the upper magnet and the lower magnet share a same magnetic pole. The magnetic circuit system further includes a primary pole core and a secondary pole core, two sides of the primary pole core respectively abut against the upper magnet and the lower magnet, and the secondary pole core is attached to the secondary magnet. A magnetic pole direction of the secondary magnet is opposite to a magnetic pole direction of the lower magnet, and the magnetic pole direction of the secondary magnet is the same as a magnetic pole direction of the upper magnet.

Beneficial effects of the present disclosure are that, since the magnetic circuit system drives the vibration system of the multifunctional sound device to vibrate and generate sound along the first direction, the vibrator of the motor reciprocally vibrates along the second direction through interacting the magnetic circuit system and the coil, and the magnetic circuit system drives the sound unit to reciprocally vibrate along the second direction, so that the speaker and the motor share one magnetic system, and the sound unit and the vibrator are assembled in the housing, which greatly reduces occupied space. The sound unit and the vibrator form a dual-vibration system, and the sound unit cooperatively vibrates with the vibrator in addition to generating sound, which improves vibration effects and further avoids adding other components, thereby saving space.

DETAILED DESCRIPTION OF EMBODIMENTS

Figure 1:
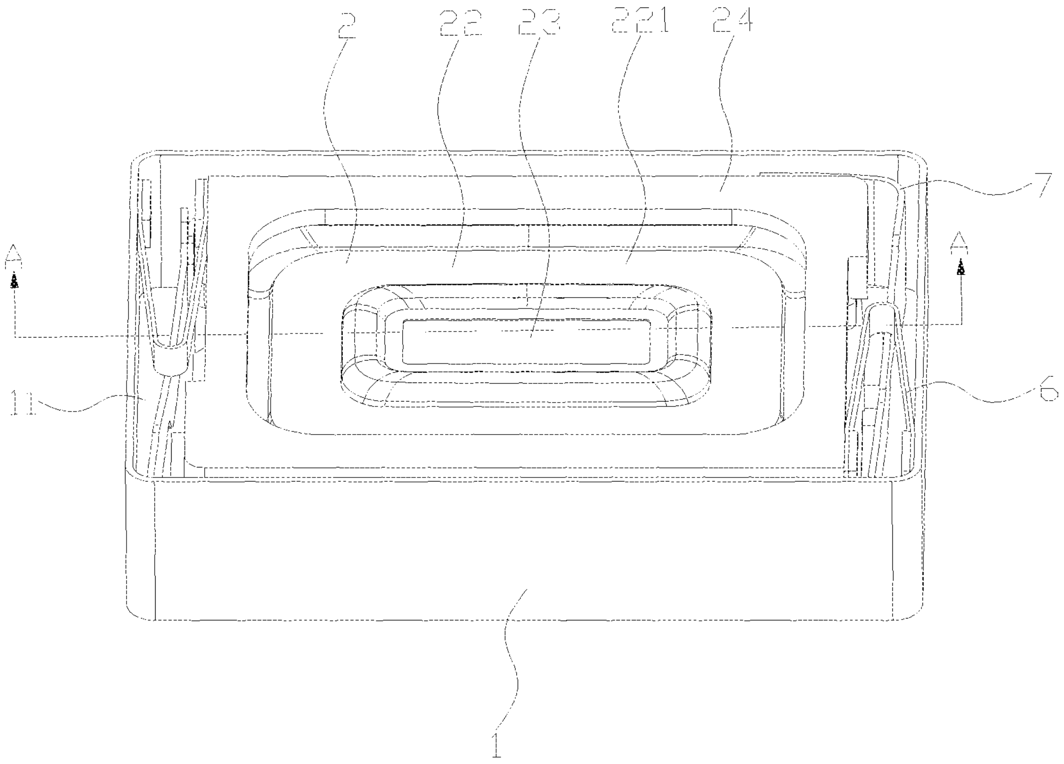
FIG. 1 is an overall structural schematic diagram of a multifunctional sound device according to one embodiment of the present disclosure.

The present disclosure is further described below with reference to the accompanying drawings and embodiments.

The present disclosure provides a multifunctional sound device, capable of applying to an electronic device, and the multifunctional sound device plays roles in feedback and prompting through generating sound and may also plays the roles in feedback and prompting through vibrating. As shown in FIGS. 1-6, the present disclosure provides the multifunctional sound device, including a housing 1, a sound unit 2, a vibrator 4, and a coil 5. The housing 1 includes an accommodating cavity 11, and the sound unit 2 is suspended in the accommodating cavity 11. The sound unit 2 includes a frame 21, a vibration system 22, and a magnetic circuit system 23. The vibration system 22 is fixed in the frame 21, and the magnetic circuit system 23 drives the vibration system 22 to vibrate and generate sound along a first direction, where the magnetic circuit system 23 includes a magnetic gap 231. The vibrator 4 is suspended in the accommodating cavity 11 and disposed on one side, distal from the vibration system 22, of the magnetic circuit system 23, and the coil 5 is assembled to the vibrator 4. The magnetic circuit system 23 interacts with the coil 5 to drive the vibrator 4 to reciprocally vibrate in a second direction, and meanwhile, the magnetic circuit system 23 drives the sound unit 2 to reciprocally vibrate in the second direction. The second direction is perpendicular to the first direction.

It should be noted that the magnetic circuit system 23 drives the vibration system 22 of the multifunctional sound device to vibrate and generate sound along the first direction, the vibrator 4 of the motor reciprocally vibrates along the second direction through interacting the magnetic circuit system 23 and the coil 5, and the magnetic circuit system 23 drives the sound unit 2 to reciprocally vibrate along the second direction, so that the speaker and the motor share one magnetic system 23, and the sound unit 2 and the vibrator 4 are assembled in the housing 1, which greatly reduces occupied space. The sound unit 2 and the vibrator 4 form a dual-vibration system 22, and the sound unit 2 cooperatively vibrates with the vibrator 4 in addition to generating sound, which improves vibration effects and further avoids adding other components, thereby saving space.

Figure 2:
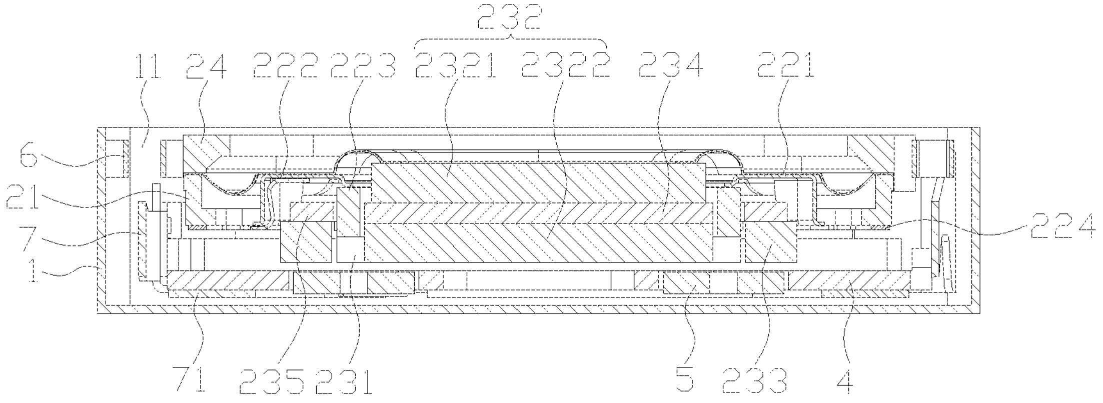
FIG. 2 is a cross-sectional schematic diagram taken along the line A-A shown in FIG. 1.
Figure 3:
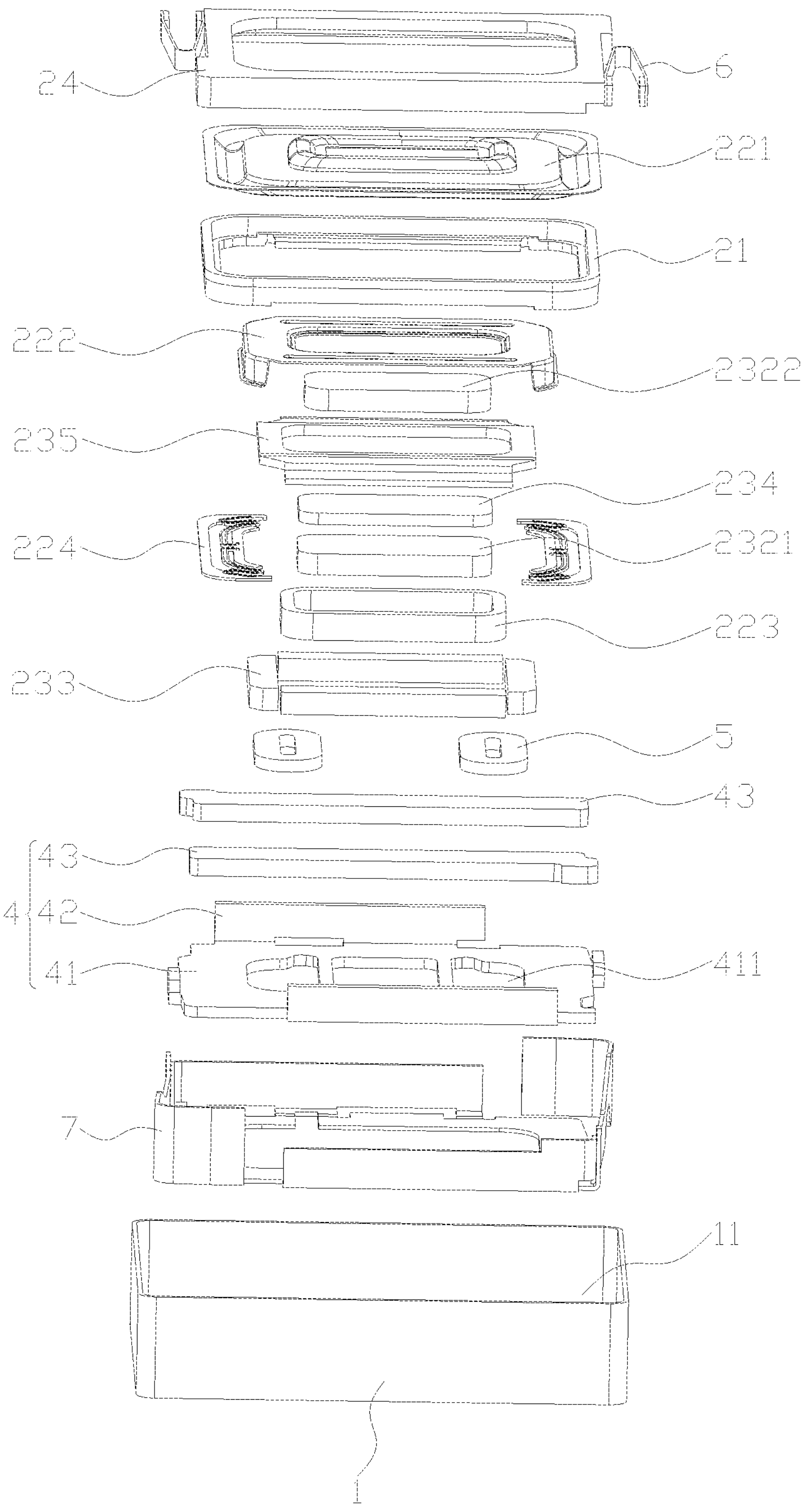
FIG. 3 is a three-dimensional exploded structural schematic diagram of the multifunctional sound device according to one embodiment of the present disclosure.

As shown in FIGS. 1-3, furthermore, the multifunctional sound device further includes first elastic components 6 and second elastic components 7. The first elastic components 6 are respectively connected to the housing 1 and the sound unit 2, and the second elastic components 7 are respectively connected to the housing 1 and the vibrator 4. That is, the sound unit 2 is suspended in the accommodating cavity 11 through the first elastic components 6, and the vibrator 4 is suspended in the accommodating cavity 11 through the second elastic components 7.

As shown in FIG. 1, in one embodiment, the first elastic components 6 are disposed on two opposite sides of the sound unit 2 along the second direction, and the first elastic components 6 are spaced apart from the second elastic components 7 along the first direction. Specifically, the multifunctional sound device includes two first elastic components 6, and the two first elastic components 6 are symmetrically disposed on two sides of the frame 21, the sound unit 2 is disposed between the first elastic components 6, so that the magnetic circuit system 23 drives the sound unit 2 to move along the second direction. The first elastic members 6 are spaced apart from the second elastic components 7, which ensures that vibration of the sound unit 2 may not interfere with vibration of the vibrator 4.

As shown in FIGS. 1-3, in one embodiment, the sound unit 2 further includes an upper cover 24, and the upper cover 24 is disposed on one side, distal from the magnetic circuit system 23, of the frame 21. The first elastic components 6 are respectively connected to the housing 1 and the upper cover 24. Specifically, the upper cover 24 is matched with the frame 21, each of the first elastic components 6 includes a first elastic arm, a second elastic arm, and elastic portions; the first elastic arm is connected to the housing 1, the second elastic arm is fixedly connected to the upper cover 24, and the elastic portions are respectively and fixedly connected to the first elastic arm and the second elastic arm, and a gap is formed between the first elastic arm and the second elastic arm. The first elastic components are U-shaped, a side plate surface of the first elastic arm is connected to the housing 1, and a side plate surface of the second elastic arm is connected to the upper cover 24. When the magnetic circuit system 23 drives the sound unit 2 to move along the second direction, the second elastic arm moves in a direction close to the first elastic arm, and at this time, the gap between the first elastic arm and the second elastic arm becomes smaller. When the first elastic components 6 drive the sound unit 2 to restore, the second elastic arm moves in a direction distal from the first elastic arm, at this time, the gap between the first elastic arm and the second elastic arm becomes bigger. Furthermore, gaskets are fixed to opposite sides of each of the first elastic arm and the second elastic arm, the gaskets may buffer collision between the first elastic arm and the second elastic arm, thereby preventing the first elastic components 6 from being damaged due to the collision between the first elastic arm and the second elastic arm. According to actual needs, the first elastic components 6 may be V-shaped or a compression spring type or others, and the gaskets may be made of an elastic material of foam, rubber, and silicone.

Figure 4:
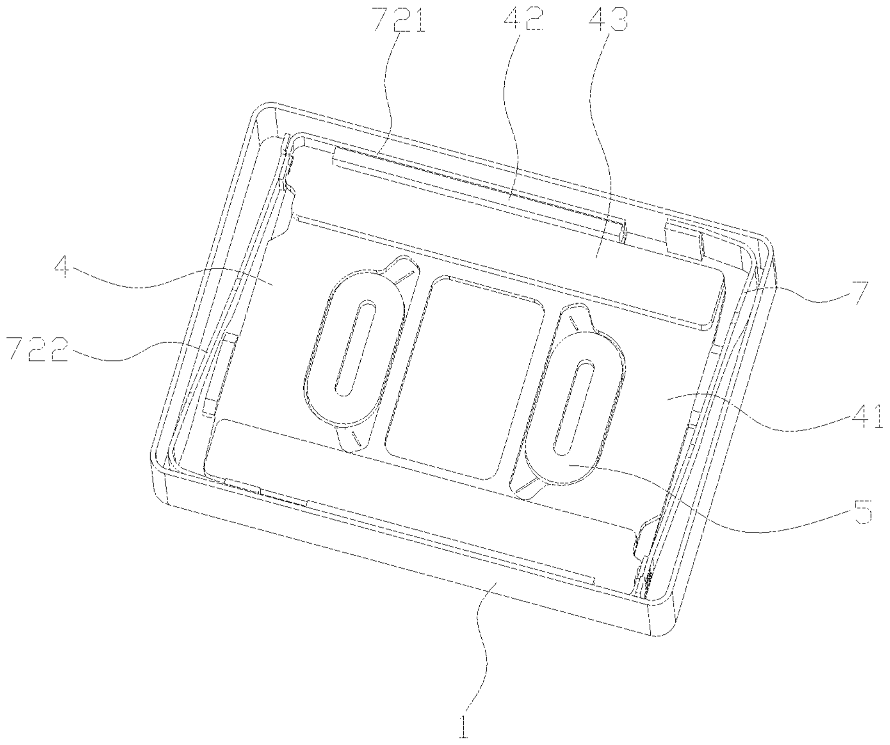
FIG. 4 is a schematic diagram of an assembly relationship of a vibrator, a coil, second elastic components, and a housing in the multifunctional sound device according to one embodiment of the present disclosure.

As shown in FIGS. 2-4, in one embodiment, the vibrator 4 includes a main body portion 41, two side wall portions 42, and two mass blocks 43. The main body portion 41 is suspended in the housing 1, the two side wall portions 42 are formed by bending and extending from two opposite ends of the main body portion 41 toward a direction of the sound unit 2, and the two mass blocks 43 are respectively and fixedly connected to the main body portion 41. The two mass blocks 43 are disposed at intervals between the two side wall portions 42. Specifically, the main body portion 41 may be a flat plate, the two mass blocks 43 are fixed to a plate surface of one side, distal from the housing 1, of the main body portion 41, the two mass blocks 43 may increase motion inertia of the vibrator 4, so that vibration effect is better. One side, close to the housing 1, of each of the two mass blocks 43 is in contact with each of the two side wall portions 42, that is, the two mass blocks 43 are aligned with the two side wall portions 42, which is beneficial for quickly and accurately fixing the two mass blocks 43 on the main body portion 41. The main body portion 41, the two side wall portions 42, the two mass blocks 43 are symmetrically disposed, which further improves vibration effect of the vibrator 4.

As show in FIGS. 3-4, in one embodiment, each of the second elastic components 7 includes a bearing portion 71 and two elastic structures 72, the bearing portion 71 is assembled to the main body portion 41, two ends of each of the two elastic structures 72 are respectively and fixedly connected to the bearing portion 71 and the housing 1, and the two elastic structures 72 are disposed on two opposite sides of the bearing portion 71 at intervals along the second direction. The two elastic structures 72 are at least partially fixed to the two side wall portions 42. The bearing portion 71 is configured to bear the vibrator 4, specifically, the main body portion 41 is fixed to a plate surface of the bearing portion 71, the vibrator 4 is suspended in the accommodating cavity 11 through the two elastic structures 72.

Figure 5:
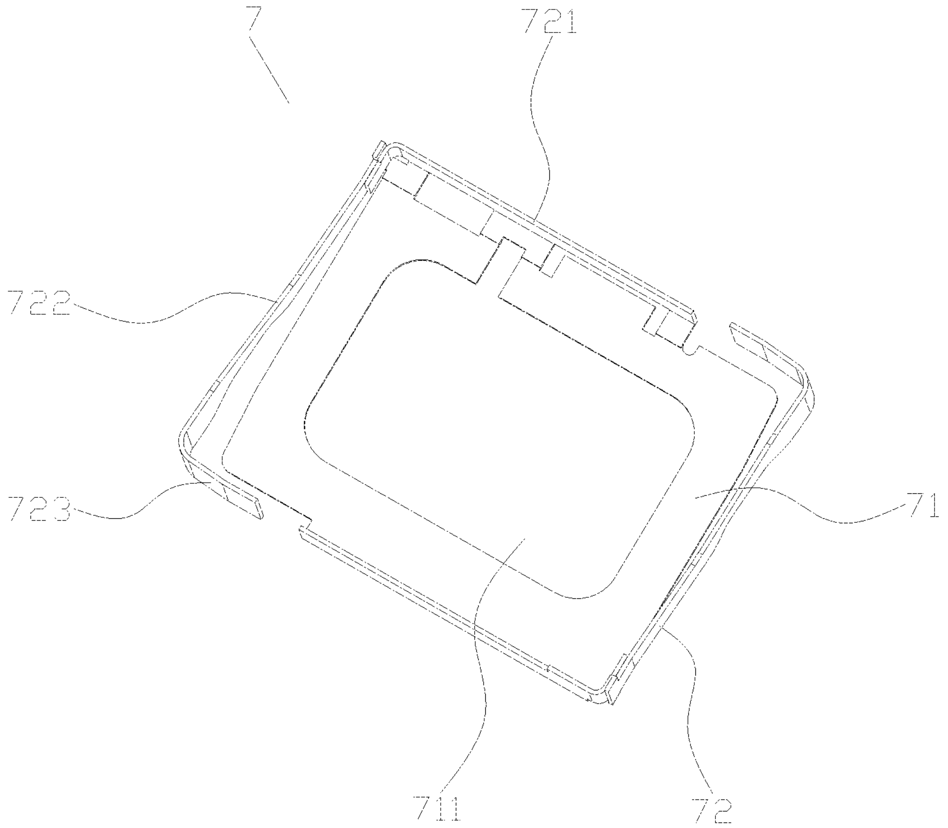
FIG. 5 is a structural schematic diagram of the second elastic components in the multifunctional sound device according to one embodiment of the present disclosure.

As shown in FIGS. 4-5, specifically, each of the two elastic structures 72 includes a first connecting portion 721, an elastic portion 722, and a second connecting portion 723. The first connecting portion 721 is fixedly connected to one end of the bearing portion 71 and is disposed between the two side wall portions 42 and the housing 1, the elastic portion 722 is formed by bending from one end of the first connecting portion 721 toward the vibrator 4, and the second connecting portion 723 is formed by bending from one end, distal from the first connecting portion 721, of the elastic portion 722 toward the vibrator 4, and the second connecting portion 723 is fixedly connected to the housing 1. The first connecting portion 721 and the second connecting portion 723 are oppositely disposed, and the first connecting portion 721 is partially attached to a respective one of the two side wall portions 42. The first connecting portion 721, the elastic portion 722, and the second connecting portion 723 are all in side plate shape, and connection between the second connecting portion 723 and the elastic portion 722 has elasticity. When the vibrator 4 moves along the second direction through interacting the magnetic circuit system 23 and the coil 5, the two mass blocks 4 drive the two elastic structures 72 to deform.

As shown in FIGS. 2-3, in one embodiment, the magnetic circuit system 23 includes a primary magnet 232 and a secondary magnet 233, the secondary magnet 233 is disposed around the primary magnet 232 to form the magnetic gap 231. A mounting through groove 411 is defined on the main body portion 41, where the mounting through groove 411 is matched with the coil 5. The coil 5 is assembled in the mounting through groove 411, and the coil 5 is disposed opposite to the magnetic gap 231 along the first direction. Specifically, the multifunctional sound device includes two coils 5, two mounting through grooves 411 are defined on the main body portion 41 at intervals, the two coils are respectively disposed in the two mounting through grooves 411, which saves occupied space by the coils and is beneficial from lighting and the thinning of the vibrator 4. A long edge of the coil 5 is perpendicular to the second direction, and a short edge of the coil is parallel to the second direction, so that the coil 5 may interact with the magnetic circuit system 23, thereby achieving that the vibrator reciprocally vibrates along the second direction. Since the coil 5 is disposed opposite to the magnetic gap 231, both the primary magnet 232 and the secondary magnet 233 may cooperate to apply magnetic forces to the coil 5, the magnetic forces respectively applied to the primary magnet 232 and the secondary magnet 233 drive the coil 5 to move in a same direction, which is beneficial for vibration of the vibrator 4. According to actual needs, an inner magnetic circuit or wire winding hole of the coil 5 directly faces the magnetic gap 231, an avoidance through groove 711 is defined on the bearing portion 71, the coil 5 is exposed in the accommodating cavity 11 through the avoidance through groove 711, which is beneficial for heat dissipation and cooling of the coil 5.

As shown in FIGS. 2-3, furthermore, the primary magnet 232 includes an upper magnet 2321 and a lower magnet 2322 opposite to the upper magnet 2321, the upper magnet 2321 and the lower magnet 2322 share a same magnetic pole. The magnetic circuit system 23 further includes a primary pole core 234 and a secondary pole core 235, two sides of the primary pole core 234 respectively abut against the upper magnet 2321 and the lower magnet 2322, and the secondary pole core 235 is attached to the secondary magnet 233. A magnetic pole direction of the secondary magnet 233 is opposite to a magnetic pole direction of the lower magnet 232, and the magnetic pole direction of the secondary magnet 233 is the same as a magnetic pole direction of the upper magnet 2321. Specifically, the upper magnet 2321 and the lower magnet 2322 are respectively and fixedly connected to two sides of the primary pole core 234, the secondary pole core 235 is fixedly connected to one side, distal from the vibrator 4, of the secondary magnet 233. South pole of the upper magnet 2321 is opposite south pole of the lower magnet 2322, the magnetic pole direction of the upper magnet 2321 is opposite to the magnetic pole direction of the lower magnet 2322, and the magnetic pole direction of the secondary magnet 233 is opposite to the magnetic pole direction of the lower magnet 2322. Furthermore, upper ends of both the upper magnet 2321 and the secondary magnet 233 are north poles, lower ends of both the upper magnet 2321 and the secondary magnet 233 are south pole, a lower end of the lower magnet 2322 is south pole, and an upper end of the lower magnet 2322 is north pole. According to actual needs, both the upper magnet 2321 and the lower magnet 2322 are cuboid, the secondary magnet 233 is annular, and a height of the secondary magnet 233 is consistent with a height the lower magnet 2322.

Figure 6:
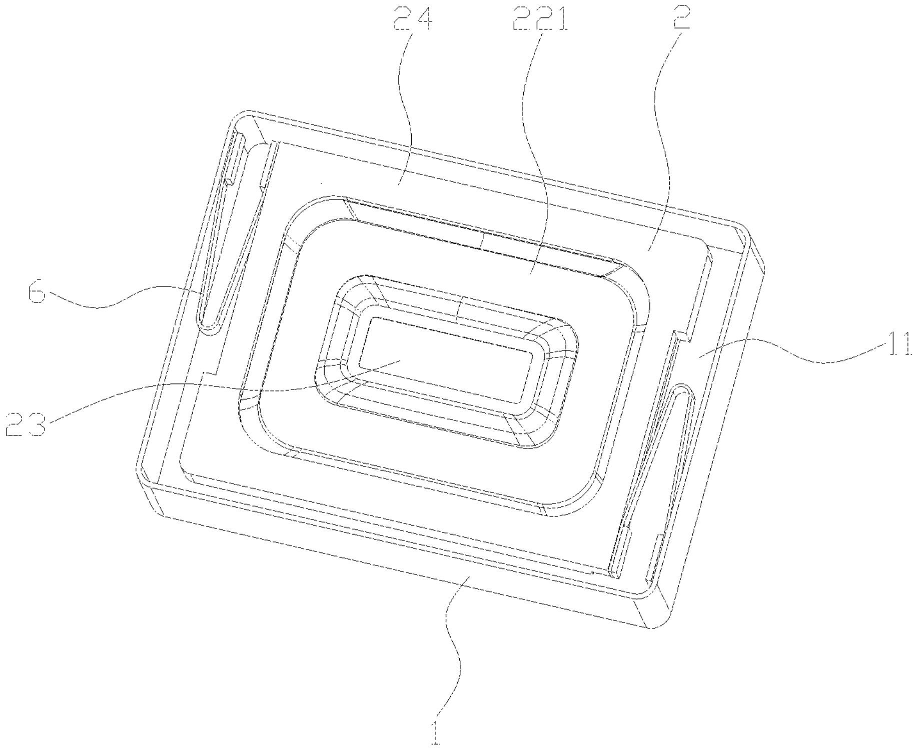
FIG. 6 is a schematic diagram of an assembly relationship of a sound unit, first elastic components, and the housing in the multifunctional sound device according to one embodiment of the present disclosure.

As shown in FIGS. 2, 3, and 6, in one embodiment, the vibration system 22 includes a vibrating diaphragm 221, a dome frame 222, and a voice coil 223, the vibrating diaphragm 221 is connected to the frame 21, the dome frame 222 is connected to the vibrating diaphragm 221, and the voice coil 223 is inserted into the magnetic gap 231 and is connected to the dome frame 222. Specifically, the vibrating diaphragm 221 includes first folding rings and second folding rings, the first folding rings are respectively connected to the frame 21 and the dome frame 222, and the second folding rings are respectively connected to an inner edge of each of the first folding rings and the primary magnet 232. The first folding rings are disposed between the frame 21 and the upper cover 24. At least part of each of the first folding rings protrudes toward a direction close to the vibrator 4 to form a first arc surface portion, and at least part of the each of the second folding rings protrudes toward a direction distal from the vibrator 4 to form a second arc surface portion, which is beneficial for the vibrating diaphragm 221 to move along the first direction. When the magnetic circuit system 23 drives the vibration system 22 to vibrate and generate sound along the first direction, the voice coil 223 drives the vibrating diaphragm 221 to vibrate along the first direction through the dome frame 222. Specifically, after the voice coil 223 is powered on, the primary magnet 232 and the secondary magnet 233 drive the voice coil 223 to vibrate in the magnetic gap 231 along the first direction, thereby driving the vibrating diaphragm 221 to vibrate, and vibration and sound generation of the sound unit 2 is achieved. In a vibration process of the vibrating diaphragm 221, the dome frame 222 may enhance strength of the sound unit 2 and improve acoustic performance of the sound unit 2, thereby improving overall sounding quality of the sound unit 2.

Specifically, the vibration system 22 further includes a flexible circuit board 224, two ends of the flexible circuit board 224 are respectively and fixedly connected to the frame 21 and the dome frame 222, the flexible circuit board 224 is disposed on one side, distal from the upper cover 24, of the frame 21. The vibration system 22 includes two flexible circuit boards 224, which is beneficial for symmetrical arrangement of the vibration system 22, thereby improving vibration effect of the vibration system 22. It should be understood that circuit where the voice coil 223 and the coil 5 are located are independent from each other, so that the voice coil 223 and the coil 5 may separately or simultaneously work, and requirements that whether the coil 6 and the voice coil 223 work or not in different application scenarios may be satisfied.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A multifunctional sound device, comprising:

a housing;

a sound unit;

a vibrator; and a coil;

wherein the housing comprises an accommodating cavity, and the sound unit is suspended in the accommodating cavity; the sound unit comprises a frame, a vibration system, and a magnetic circuit system; the vibration system is fixed in the frame, and the magnetic circuit system drives the vibration system to vibrate and generate sound along a first direction, where the magnetic circuit system comprises a magnetic gap; the vibrator is suspended in the accommodating cavity and disposed on one side, distal from the vibration system, of the magnetic circuit system, and the coil is assembled to the vibrator; the magnetic circuit system interacts with the coil to drive the vibrator to reciprocally vibrate in a second direction, and meanwhile, the magnetic circuit system drives the sound unit to reciprocally vibrate in the second direction; the second direction is perpendicular to the first direction.

2. The multifunctional sound device according to claim 1, wherein the multifunctional sound device further comprises first elastic components and second elastic components; the first elastic components are respectively connected to the housing and the sound unit, and the second elastic components are respectively connected to the housing and the vibrator.

3. The multifunctional sound device according to claim 2, wherein the first elastic components are disposed on two opposite sides of the sound unit along the second direction, and the first elastic components are spaced apart from the second elastic components along the first direction.

4. The multifunctional sound device according to claim 3, wherein the sound unit further comprises an upper cover, and the upper cover is disposed on one side, distal from the magnetic circuit system, of the frame; the first elastic components are respectively connected to the housing and the upper cover.

5. The multifunctional sound device according to claim 2, wherein the vibrator comprises a main body portion, two side wall portions, and two mass blocks; the main body portion is suspended in the housing, the two side wall portions are formed by bending and extending from two opposite ends of the main body portion toward a direction of the sound unit, and the two mass blocks are respectively and fixedly connected to the main body portion; the two mass blocks are disposed at intervals between the two side wall portions.

6. The multifunctional sound device according to claim 5, wherein each of the second elastic components comprises a bearing portion and two elastic structures, the bearing portion is assembled to the main body portion, two ends of each of the two elastic structures are respectively and fixedly connected to the bearing portion and the housing, and the two elastic structures are disposed on two opposite sides of the bearing portion at intervals along the second direction; and the two elastic structures are at least partially fixed to the two side wall portions.

7. The multifunctional sound device according to claim 6, wherein each of the two elastic structures comprises a first connecting portion, an elastic portion, and a second connecting portion; the first connecting portion is fixedly connected to one end of the bearing portion and is disposed between the two side wall portions and the housing, the elastic portion is formed by bending from one end of the first connecting portion toward the vibrator, and the second connecting portion is formed by bending from one end, distal from the first connecting portion, of the elastic portion and is fixedly connected to the housing; the first connecting portion and the second connecting portion are oppositely disposed, and the first connecting portion is partially attached to a respective one of the two side wall portions.

8. The multifunctional sound device according to claim 5, wherein a mounting through groove is defined on the main body portion, where the mounting through groove is matched with the coil; the coil is assembled in the mounting through groove, and the coil is disposed opposite to the magnetic gap along the first direction.

9. The multifunctional sound device according to claim 1, wherein the magnetic circuit system comprises a primary magnet and a secondary magnet, the secondary magnet is disposed around the primary magnet to form the magnetic gap; the vibration system comprises a vibrating diaphragm, a dome frame, and a voice coil, the vibrating diaphragm is connected to the frame, the dome frame is connected to the vibrating diaphragm, and the voice coil is inserted into the magnetic gap and is connected to the dome frame.

10. The multifunctional sound device according to claim 9, wherein the primary magnet comprises an upper magnet and a lower magnet opposite to the upper magnet, the upper magnet and the lower magnet share a same magnetic pole; the magnetic circuit system further comprises a primary pole core and a secondary pole core, two sides of the primary pole core respectively abut against the upper magnet and the lower magnet, and the secondary pole core is attached to the secondary magnet; a magnetic pole direction of the secondary magnet is opposite to a magnetic pole direction of the lower magnet, and the magnetic pole direction of the secondary magnet is the same as a magnetic pole direction of the upper magnet.

* * * * *